United States Patent [19]

Beranek, Jr. et al.

[11] 4,038,356
[45] July 26, 1977

[54] METHOD AND APPARATUS FOR MAKING A FIBROUS BOARD-LIKE PRODUCT HAVING A MALE EDGE AND A FEMALE EDGE

[75] Inventors: Robert Louis Beranek, Jr., Joshua; Donny Lee Timms, Cleburne, both of Tex.

[73] Assignee: Johns-Manville Corporation, Denver, Colo.

[21] Appl. No.: 676,775

[22] Filed: Apr. 14, 1976

[51] Int. Cl.² .......................... B29D 3/02; B29G 5/00
[52] U.S. Cl. .................................. 264/160; 264/257; 264/284; 264/320
[58] Field of Search ............... 264/146, 147, 160, 119, 264/257, 284, 322, 280, 299, 323, 320, 236, 347, 157; 425/324 R, 343, 308; 156/500

[56] References Cited

U.S. PATENT DOCUMENTS

| | | | |
|---|---|---|---|
| 3,071,805 | 1/1963 | Merkle | 264/280 |
| 3,490,973 | 1/1970 | Graff et al. | 156/156 |
| 3,583,030 | 6/1971 | Terry et al. | 425/397 |
| 3,865,540 | 2/1975 | Loeffler | 432/72 |

*Primary Examiner*—Willard E. Hoag

*Attorney, Agent, or Firm*—Robert M. Krone; Joseph J. Kelly

[57] ABSTRACT

Disclosed is a method for making a board-like product capable of being formed into a duct section having a male end and a female end for joining sections together to form a duct. Inorganic fibers coated with a heat setable binder and collected in the form of a blanket are passed between heated moving surfaces to cure the binder in the top and bottom surface portions. The resultant partially cured blanket is then passed between one or more sets of heated platens to completely cure the binder and to shape the blanket to the desired thickness and configuration. A flat valley depression is formed longitudinally along the blanket down its center portion, and each edge is provided with a male edge, in the first set of platens. After the blanket has been shaped and cured, it is separated into two strips along the middle portion of the flat valley to form two strips, each having a female edge along one longitudinal edge and a male edge along the opposite edge. The method and apparatus of the present invention provides an improved female edge, i.e., one having a much smaller radius than produced in the prior art process and capable of forming better joints in air duct systems.

3 Claims, 9 Drawing Figures

U.S. Patent    July 26, 1977    4,038,356
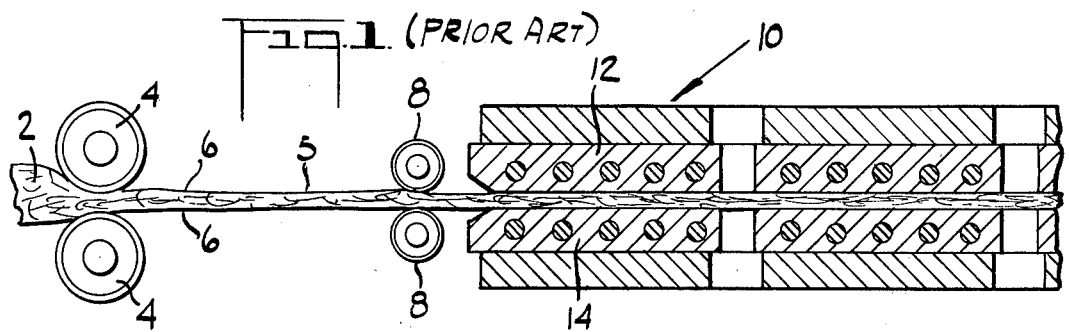
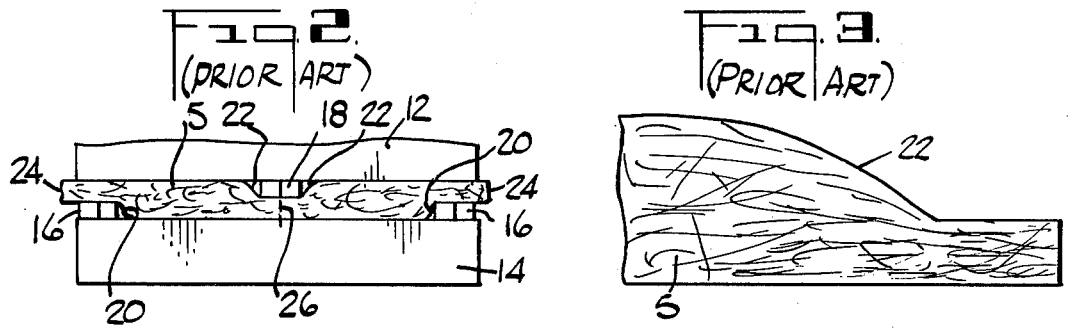
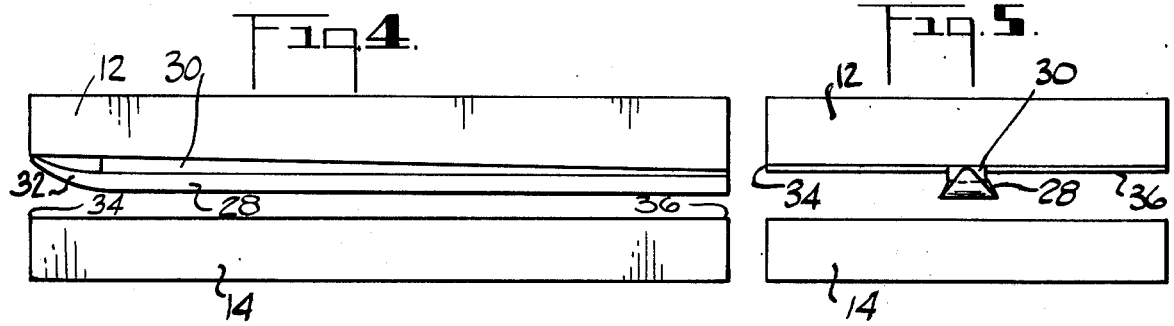
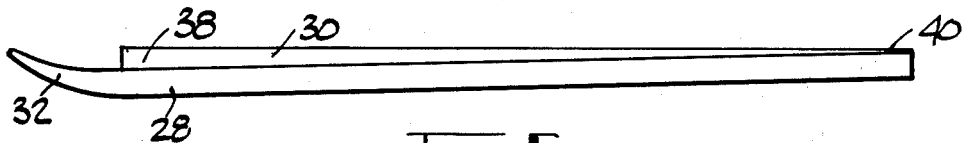
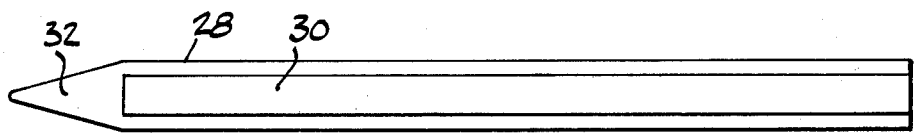
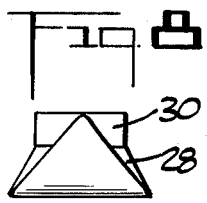

METHOD AND APPARATUS FOR MAKING A FIBROUS BOARD-LIKE PRODUCT HAVING A MALE EDGE AND A FEMALE EDGE

Air duct made from inorganic fibrous board-like material is old. One process and apparatus suitable for making the board-like fibrous precursor for air duct is disclosed in U.S. Pat. No. 3,583,030, e.g., see FIG. 10. Looking at the cross-section of the product shown in FIG. 10 of that patent, the board-like material would be made in a length of about 4 feet from the left end to the right end. A female edge was formed on the left side and a male edge was formed on the right side. The board-like material would be cut into lengths equivalent to the circumference of the duct to be formed and grooves would be cut perpendicular to the male and female edges correspondng to the locations where it would be necessary to bend the board-like material to form the duct, usually having a rectangular or square cross-section. Once the duct was formed one end would have a female end and the opposite end would have a male end so that the 4 foot duct sections could be joined together for support and to provide a seal.

In the method and apparatus disclosed in U.S. Pat. No. 3,583,030 a single strip 4 feet wide was formed such that the male and female edges were formed along the outer edges. While this process and apparatus produced a satisfactory product, and a product having satisfactory male and female edges, its production capacity and efficiency was undesirably low for this type of product due to the 4 foot width being produced. Line speed was limited because of the required curing time for the binder in the blanket.

The production capacity was increased by at least doubling the width of the blanket being produced using an apparatus of the type disclosed in U.S. Pat. No. 3,865,540 and modified as shown in the present FIGS. 1 and 2. Upon going to a greater width and producing at least two 4 foot wide strips simultaneously, it became necessary to form two male or two female edges simultaneously down the center portion of the fiber glass blanket and then to separate the wide strip in the center to form two strips of material suitable for 4 foot long duct sections. Preferably, the female edge for both strips was formed in the center of the wide blanket using heated platens and by placing a die having a rectangular cross-section on its bottom surface down the center of the upper platen in the first set of heated platens, as shown in FIG. 2. The leading edge of the die was tapered like a wedge to reduce the tendency of the blanket to hang up on the leading edge of the die. This process and apparatus produced a finished female edge such as that shown in FIG. 3. The female edge shown in FIG. 3 is quite different than the female edge shown on the left side of the cross-section in FIG. 10 of U.S. Pat. No. 3,518,157, and is less desirable because of the relatively gradually sloped portion between the top of the duct board and the higher density outer lip. When a male edge is inserted into the female end of a duct made with this board, if not done carefully, the male portion of the duct could ride up the relatively flat slope (long radius) producing a projection into the interior of the duct that would cause undesirable air resistance.

Although the die shown on the upper platen in FIG. 2 is the same type of die used to form the male edges on the outer edges of the platen, when used in the center of the platen to form two female edges back-to-back, the undesirable long radius relatively flat slope shown in FIG. 3 is produced. The reason for the longer radius and flatter slope produced in the center of the blanket is not fully understood, but may be caused by the fact that the blanket in the center is not as free to move and stretch as it is along the outer unrestricted edges where the male edges are formed. The male edges produced by the same die shown on the upper platen in FIG. 2, but located along the outer edges of the lower platen produce a shorter radius and steeper sloped edge of the type shown in FIG. 9, but of course inverted.

BRIEF SUMMARY OF THE INVENTION

The present invention provides a method of overcoming the above-described problem in the manufacture of a fibrous duct board having a female edge and a male edge wherein a blanket of selected fibers having a heat setting binder thereon is passed between a pair of spaced heated moving surfaces to cure the binder in the top and bottom surface portions of the blanket whereafter the partially cured blanket is then passed between opposed heated first and second platens spaced apart less than the thickness of the blanket to shape the blanket to the desired configuration and to cure the binder to maintain that configuration. This configuration includes a flat valley depression along the length of the blanket and down the center portion of the blanket to form two female edges back-to-back, and thereafter cutting and separating the blankets longitudinally down the center portion of the flat valley to produce two strips having a female edge along one edge and a male edge along the opposite edge.

In the process of the present invention, a female edge, having a shorter radius and a much steeper slope than that produced by the prior art described above, is produced by tilting at least one of the first set of platens such that the space between the platens where the blanket enters is greater than the space between the platens at the downstream end of the first set of platens and placing a tapered shim between the shoe on the first platen and the first platen whereby the first blanket between the shoe and the opposite platen is formed to essentially its final thickness in the upstream portion of the first set of platens while the final thickness of those portions of the blanket adjacent to the shoe is not formed until the blanket reaches the downstream end portion of the first set of platens.

Preferably, the shoe is tapered and turned up at its front end in a manner similar to a snow ski to avoid hanging up on the blanket of fibrous material and also preferably, a cross-section of the forming portion of the shoe is trapezoidal in shape with the long edge being next to the fibrous blanket and the short edge being closest to the platen. Also, the surface of the blanket that will be next to the forming shoe is preferably slit to a desired depth prior to entering the first set of platens.

The present invention also provides an apparatus for practicing the above-described method, which apparatus is similar to that disclosed in U.S. Pat. No. 3,865,540, but modified to provide for tilting of one or more of the platens in the first set of platens and a forming shoe having a tapered shim whereby the bottom surface of the forming shoe is closer to the opposite platen surface at the downstream end than at the upstream end. Preferably the portion of the shoe adjacent to the upstream end of the platen is tapered and turned up in a similar manner to a snow ski and also preferably, a cross-section of the forming shoe has a trapezoidal shape with the longest edge being the edge farthest from the surface of the platen to which the shoe is attached.

BRIEF DESCRIPTION OF THE DRAWINGS

FIG. 1 is a portion of a prior art device shown in more detail in FIG. 1 of U.S. Pat. No. 3,865,540.

FIG. 2 is a partial front view of a modification of the first set of platens in the apparatus shown in FIG. 1.

FIG. 3 shows an end view of a female edge produced by the apparatus shown in FIG. 2.

FIG. 4 is a side view of a first set of platens having a forming shoe according to the present invention.

FIG. 5 is an end view of the platens shown in FIG. 4 and looking from the upstream end to the downstream end of the platens.

FIG. 6 is a side view of a forming shoe and a shim used on the upper platen in FIG. 4.

FIG. 7 is a plan view of the shoe and shim shown in FIG. 6.

FIG. 8 is a front view of the shoe and shim shown in FIGS. 6 and 7.

FIG. 9 is a partial view of a duct board having a female edge and made according to the present invention.

DETAILED DESCRIPTION AND PREFERRED EMBODIMENTS

Referring to FIG. 1, a blanket of inorganic fibers, such as glass fibers, having a heat setable binder coated on the surface is passed between a pair of heated moving surfaces, such as searing rolls 4, to produce a thinner blanket 5 having surface portions 6 in which the binder is cured to provide sufficient strength to allow the blanket to be pulled through heated platens 10. The pair of guide and compression rolls 8 can be used to reduce the thickness of the blanket sufficiently to facilitate the blanket passing into the first set of heated platens 10. As indicated by FIG. 1 and as shown in more detail in U.S. Pat. No. 3,865,540, as many sets of heated opposed platens can be used as is necessary to shape the fibrous blanket to the desired thickness and configuration and to cure the binder on the surfaces of the fibers sufficiently to essentially maintain that thickness and configuration. Each of the platens 10 comprises an upper heated platen 12 and a lower platen 14.

The apparatus disclosed in FIG. 1 can be used to make fiber glass duct board in a manner shown in FIG. 2. FIG. 2 is a partial end view of the first set of platens 10 showing the upper platen 12 and the lower platen 14 with the fiber glass blanket 5 therebetween. A male edge forming die 16 ran the entire length of the lower platen 14 along each of its outer edges. The male edge forming die 16 was wedged at the front end to reduce the tendency of the fiber glass blanket 5 from hanging up on the leading edge of the male forming die. A female edge forming die 18 was attached to the upper platen 12 and ran down the center portion of the upper platen 12. The female edge forming die 18 was wedged at the front end in the same manner as the male edge forming die 16.

As can be seen in FIG. 2 the shoulder 20 on the male edges was very steep having a short radius while the shoulders 22 on the two female edges formed in the center of the blanket by the die 18 had a very gradual slope and a large radius. It is not completely understood why the shoulders 20 are so much deeper than the shoulders 22, but is is thought that this might be caused by the different locations of the forming die 16 and the forming die 18 with respect to the outer edges 4 of the blanket. The forming dies 16 were much closer to the edges 24 than the forming die 18, and the fiber glass blanket adjacent to the forming dies 16 was not as restricted to movement by the platens 12 and 14 as that area of the blanket 5 in contact with and immediately adjacent to the female edge forming member 18.

After the blanket 5 has passed through a sufficient number of platens to complete the cure, a separation is made in the center of the female edge portions represented by the dotted line 26 to form two strips of duct board material having female edges such as shown in FIG. 3 on each strip. The outer rough edges 24 of each strip were also trimmed off to provide a sharp male edge.

The present invention provides a method and apparatus for producing a female edge in the process and apparatus described above having a steep shoulder with a small radius, not unlike the male edges produced in the process described above. The apparatus used to accomplish this result is shown in FIGS. 4–8. It is to be understood that a complete and detailed set of drawings would include the male edge forming members as disclosed in FIG. 2, but these have been moved to better illustrate the present invention.

In the present invention, the prior art female edge forming die 18 is replaced by a die 28 and a shim 30, as shown in FIGS. 4 and 5 and as illustrated in more detail in FIGS. 6–8. The front portion 32 of the die 28 is preferably tapered and turned upward like a ski tip to facilitate entry of the fibrous blanket into the set of platens.

As best shown in FIGS. 4 and 5, the first set of platens are tilted such that the distances between the surface of the upper platen 12 and the lower platen 14 is greater at the entry end 34 than at the exit end 36. The shim 30 is tapered such that the upstream end 38 is thicker than the downstream end 40. Preferably the degree of taper in the shim 30 matches the degree of tilting of one or both platens 12 or 14. Thus, when the fibrous blankets enters the entry end 34 of the first set of platens, that portion of the blanket beneath the upstream end of the die 28 is quickly formed substantially or essentially to its final thickness, while the blanket adjacent either side of the die 28 is formed to a thickness greater than its final thickness and is gradually formed to its final thickness as the blanket moves along the length of platens 12 and 14. To achieve this effect, it is preferred to tilt the upper platen 12, as shown in FIGS. 4 and 5.

FIG. 9 illustrates the improved female edge produced by the apparatus and technique of the invention. Note the steepness of the shoulder 42 and its much smaller radius as compared to the shoulder 22 in the prior art female edge, FIG. 3.

As shown in FIG. 8, the die 28 is preferably trapezoidal in cross-section. The long side of the trapezoid lies in the working face of the die 28.

Sometimes wrinkling of the surface on the shoulder 42 occurs. This wrinkling can be avoided by slitting the upper surface of the fibrous blanket to a depth of about $\frac{1}{8}$ to $\frac{1}{2}$ inch deep, preferably three-eighths of an inch deep, in the center of the blanket in the vicinity of the line where the blanket will later be separated to form two strips (see line 26 in FIG. 2). This slitting can be accomplished with any suitable device, such as the roller blade shown in FIG. 1 of U.S. Pat. No. 3,661,491. Apparently this slitter allows the surface portion of the fibrous blanket to stretch sufficiently to avoid wrinkling.

In the present invention, the male edges are formed in the same manner as in the prior art and as shown in FIG. 2. Preferably, the underneath section of the blanket 5 is slit in the vicinity of the male die 16 prior to entering the first set of platens, but this is not essential.

While the shoe 28 and the shim 30 are shown in the drawings as separate pieces, it is to be understood that the two pieces could be made as a single element.

In describing the invention certain embodiments have been described to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead is to be limited only by the claims appended hereto.

What we claim is:

1. A method of making two or more strips of fibrous duct board, each strip having a female edge and a male edge wherein a blanket of collected fibers having a heat setting binder thereon is passed between a pair of spaced apart heated moving surfaces to partially cure the binder in the top and bottom surface portions of the blanket, said blanket is then passed between opposed heated first and second platens spaced apart less than the thickness of said blanket to shape the blanket and cure the binder in said blanket, a first platen having a shoe spaced between its side edges and running along the length of the platen to form a flat valley depression along the length of said blanket, the portion of the blanket lying below the flat valley having a higher density than the blanket adjacent said valley, the second platen having a male edge forming die running along its length at or near each side edge of the platen to form a male edge along each outer edge portion of said blanket, and separating said blanket longitudinally in said flat valley depression to form said strip; the improvement comprising:

forming the portion of said blanket between the shoe and the opposite platen to essentially its final thickness in the upstream portion of said platens and gradually reducing the thickness of those portions of the blanket adjacent said shoe as said blanket is moved along between said first and second platens, said final thickness of the blanket in said adjacent portions being formed only in the downstream end portion of said platens.

2. A method as defined in claim 1 wherein the thickness of the blanket in said adjacent portions is about one-half inch greater at the upstream end portion of said platens than the thickness of the blanket in said adjacent portions at the downstream end of said platens.

3. A method as defined in claim 1 wherein the upper surface of said blanket is slit to a depth of between about one-fourth inch to about one-half inch along the length of the blanket just prior to entering said platens from the surface to be adjacent to said shoe and at a location that will be in contact with the forming surface of the shoe.

* * * * *